(12) United States Patent
Jaksa

(10) Patent No.: US 12,719,378 B2
(45) Date of Patent: Aug. 25, 2026

(54) DUAL ACTIVE BRIDGE OPTIMIZATION WITH TRIPLE PHASE SHIFT AND VARIABLE INDUCTOR

(71) Applicant: Murata Manufacturing Co., Ltd., Nagaokakyo (JP)

(72) Inventor: Rubinic Jaksa, Markham (CA)

(73) Assignee: MURATA MANUFACTURING CO., LTD., Kyoto (JP)

( * ) Notice: Subject to any disclaimer, the term of this patent is extended or adjusted under 35 U.S.C. 154(b) by 232 days.

(21) Appl. No.: 18/275,639

(22) PCT Filed: Feb. 11, 2022

(86) PCT No.: PCT/US2022/016107

§ 371 (c)(1),
(2) Date: Aug. 3, 2023

(87) PCT Pub. No.: WO2022/177818

PCT Pub. Date: Aug. 25, 2022

(65) Prior Publication Data

US 2024/0297590 A1 Sep. 5, 2024

Related U.S. Application Data

(60) Provisional application No. 63/150,210, filed on Feb. 17, 2021.

(51) Int. Cl.
*H02M 3/335* (2006.01)
*H02M 1/00* (2006.01)

(52) U.S. Cl.
CPC ..... *H02M 3/33573* (2021.05); *H02M 1/0032* (2021.05); *H02M 1/0058* (2021.05); *H02M 3/33584* (2013.01)

(58) Field of Classification Search
CPC ........ H02M 3/01; H02M 3/015; H02M 3/156; H02M 3/22; H02M 3/24; H02M 3/28;
(Continued)

(56) References Cited

U.S. PATENT DOCUMENTS 8,970,161 B1 3/2015 Cuadros
10,050,534 B1 8/2018 Murthy-Bellur et al.
(Continued)

FOREIGN PATENT DOCUMENTS

CN 104901550 A 9/2015

OTHER PUBLICATIONS

Official Communication issued in International Patent Application No. PCT/US2022/016107, mailed on May 20, 2022.
(Continued)

*Primary Examiner* — Thienvu V Tran
(74) *Attorney, Agent, or Firm* — Keating & Bennett, LLP

(57) ABSTRACT

A dual active bridge (DAB) converter includes a variable inductor and a controller configured or programmed to control the DAB converter using triple-phase-shift control. The controller can include a first proportional-integral controller to determine a parameter x based on comparison of a reference voltage and a measured voltage corresponding to either an HV voltage or an LV voltage; a voltage ratio calculator to determine a voltage ratio; a boundary calculator to calculate, based on the voltage ratio, a first boundary value corresponding to a boundary between low and medium power modes and a second boundary value corresponding to a boundary between the medium and high power modes; and a phase-shift-ratio calculator to determine phase shift ratios used in the triple-phase-shift control based on the parameter x, the voltage ratio, the first boundary value, and the second boundary value.

16 Claims, 8 Drawing Sheets

(58) Field of Classification Search

CPC .... H02M 3/315; H02M 3/3155; H02M 3/335; H02M 3/33569; H02M 3/33571; H02M 3/33573; H02M 3/33576; H02M 3/33584; H02M 3/33592; H02M 1/0003; H02M 1/0016; H02M 1/0019; H02M 1/0022; H02M 1/0025; H02M 1/0032; H02M 1/0035; H02M 1/0043; H02M 1/0048; H02M 1/0054; H02M 1/0058; H02M 1/0064; H02M 1/0067; H02M 1/083; H02M 1/084; H02M 1/0845; H02M 1/38; H02M 1/385; H02M 7/162; H02M 7/219; H02M 7/521; H02M 7/523; H02M 7/5387; H02M 7/53878; Y02B 70/10

USPC ...... 363/15–21.3, 40–43, 44–48, 65, 74, 76, 363/95–98, 123, 131–134; 323/212–219, 323/235, 238, 247, 250–253, 271–275, 323/280, 282–286, 299–303, 319, 321, 323/351

See application file for complete search history.

(56) References Cited

U.S. PATENT DOCUMENTS

| | | | | |
|---|---|---|---|---|
| 10,263,456 | B1 | 4/2019 | Wang et al. | |
| 10,749,441 | B1 | 8/2020 | Singh et al. | |
| 2016/0049877 | A1 | 2/2016 | Kang et al. | |
| 2020/0266714 | A1 | 8/2020 | Taylor et al. | |
| 2020/0287413 | A1* | 9/2020 | Peretz | H02J 50/90 |
| 2023/0291300 | A1* | 9/2023 | Bae | H02M 3/33576 |

OTHER PUBLICATIONS

Calderon et al., "General Analysis of Switching Modes in a Dual Active Bridge with Triple Phase Shift Modulation", energies, vol. 11, Issue 9, Sep. 12, 2018, pp. 1-23.

Medini et al., "A Current-Controlled Variable-Inductor for High Frequency Resonant Power Circuits", IEEE, 1994, pp. 219-225.

Zhao et al., "Overview of Dual-Active-Bridge Isolated Bidirectional DC-DC Converter for High-Frequency-Link Power-Conversion System", IEEE Transactions On Power Electronics, vol. 29, No. 8, Aug. 2014, pp. 4091-4106.

Song et al., "Modeling and Optimization of Dual Active Bridge DC-DC Converter with Dead-Time Effect under Triple-Phase Shift Control", energies vol. 12, No. 6, Mar. 13, 2019, pp. 1-24.

Tong et al., "Modeling and Analysis of Dual-Active-Bridge Isolated Bidirectional DC/DC Converter to Minimize RMS Current with Whole Operating Range", IEEE, Apr. 12, 2017, 15 pages.

Official Communication issued in corresponding German Patent Application No. 112022000443.6, mailed on Jul. 21, 2025, 4 pages.

Saeed et al., "Dual-Active-Bridge Isolated DC-DC Converter With Variable Inductor for Wide Load Range Operation", IEEE Transactions On Power Electronics, vol. 36 No. 7, Jan. 5, 2021, 17 pages.

Saeed et al., "Extended Operational Range of Dual-Active-Bridge Converters by using Variable Magnetic Devices", IEEE Applied Power Electronics Conference and Exposition (APEC), May 27, 2019, pp. 1629-1634.

Saeed et al., "Evaluation of temperature effect on inductance computation in variable magnetic components for Dual-Active-Bridge application", IEEE Energy Conversion Congress and Exposition (ECCE), Oct. 30, 2020, pp. 3286-3292.

Official Communication issued in corresponding Chinese Patent Application No. 202280014915.0, mailed on Mar. 25, 2026, 6 pages.

* cited by examiner

DUAL ACTIVE BRIDGE OPTIMIZATION WITH TRIPLE PHASE SHIFT AND VARIABLE INDUCTOR

BACKGROUND OF THE INVENTION

1. Field of the Invention

The present invention relates to DC-DC converters. More specifically, the present invention relates to active control of a dual active bridge DC-DC converter.

2. Description of the Related Art

Due to an explosive growth in renewable energy sources, dual active bridge (DAB) power conversion topology has gained significant interest. As shown in FIG. 1, DAB converters include a high-voltage (HV) H-bridge and a low-voltage (LV) H-bridge connected by a transformer T and include an inductor L connected between the HV H-bridge and the transformer T. Ongoing worldwide research into optimizing DAB has resulted in complex modulation schemes to optimize various aspects of the converter topology. Reducing root mean square (RMS) current and circulating current in high-power high-current applications is of pivotal importance for this topology. However, a trade-off between the effectiveness of a modulation scheme and the flexibility of the modulation scheme in digital implementation reduces the overall usability in industrial applications and diminishes the benefits of complex control processes.

SUMMARY OF THE INVENTION

To overcome the problems described above, preferred embodiments of the present invention provide a DAB converter with a variable inductor that is able to be operated with partial or full zero-voltage-switching (ZVS) turn on and a near zero current switching (ZCS) turn off of a leg in the HV H-bridge and a near ZCS or reduced current turn off of the legs of the LV H-bridge.

According to a preferred embodiment of the present invention, a dual active bridge (DAB) converter includes a variable inductor and a controller configured or programmed to control the DAB converter using triple-phase-shift control.

An inductance of the variable inductor can be controlled by the controller such that switches in a leg of a high-voltage (HV) H-bridge of the DAB converter turned on with zero voltage switching or partial zero voltage switching and turned off with near zero current switching and such that switches in both legs of a low-voltage (LV) H-bridge of the DAB converter turn off with reduced current switching or near zero current switching.

The controller can be configured or programmed to operate in low, medium, and high power modes and can be configured or programmed to control the variable inductor such that the DAB converter is operated in the medium power mode near a boundary between the low and the medium power modes.

The HV bridge can be connected to a HV voltage, the LV bridge can be connected to a LV voltage, and the controller can be configured or programmed to include:

- a first proportional-integral (PI) controller to determine a parameter x based on comparison of a reference voltage and a measured voltage corresponding to either the HV voltage or the LV voltage;
- a voltage ratio calculator to determine a voltage ratio based on either:
  - a turns ratio of the transformer, the HV voltage, and the LV voltage; or
  - the turns ratio of the transformer, the reference voltage, and the measured voltage;
- a boundary calculator to calculate, based on the voltage ratio, a first boundary value corresponding to the boundary between the low and the medium power modes and a second boundary value corresponding to a boundary between the medium and high power modes; and
- a phase-shift-ratio calculator to determine phase shift ratios used in the triple-phase-shift control based on the parameter x, the voltage ratio, the first boundary value, and the second boundary value.

In a preferred embodiment of the present invention, a converter includes a high-voltage (HV) H-bridge including first and second HV legs, a low-voltage (LV) H-bridge including first and second LV legs, a transformer connecting the HV and the LV H-bridges; a variable inductor connected between the HV H-bridge and the transformer, and a controller configured or programmed to control switching of switches in the HV and the LV H-bridges and control an inductance of the variable inductor.

The controller can be configured or programmed to control the inductance of the variable inductor to control current in switches in the second HV leg at turn on and at turn off.

The controller can be configured or programmed to control the inductance of the variable inductor such that switches in the second HV leg are turned on with zero voltage switching or partial zero voltage switching and are turned off with near zero current switching and such that switches in the first and the second LV legs are turned off with reduced current switching or near zero current switching.

The controller can be configured or programmed to operate in low, medium, and high power modes and can be configured or programmed to control the variable inductor such that the converter is operated in the medium power mode near a boundary between the low and the medium power modes.

The HV bridge can be connected to a HV voltage, the LV bridge can be connected to a LV voltage, and the controller can be configured or programmed to include:

- a first proportional-integral (PI) controller to determine a parameter x based on comparison of a reference voltage and a measured voltage corresponding to either the HV voltage or the LV voltage;
- a voltage ratio calculator to determine a voltage ratio based on either:
  - a turns ratio of the transformer, the HV voltage, and the LV voltage; or
  - the turns ratio of the transformer, the reference voltage, and the measured voltage;
- a boundary calculator to calculate, based on the voltage ratio, a first boundary value corresponding to the boundary between the low and the medium power modes and a second boundary value corresponding to a boundary between the medium and high power modes; and
  - a phase-shift-ratio calculator to determine phase shift ratios used in the triple-phase-shift control based on the parameter x, the voltage ratio, the first boundary value, and the second boundary value.

The controller can be configured or programmed to include a second PI controller to control the variable inductor based on a comparison of the parameter x and the first boundary value.

The controller can be configured or programmed to include a pulse width modulator to control the switching of the switches in the HV and the LV H-bridges using pulse width modulated signals based on the phase shift ratios.

The converter can include a controlled DC power source connected to the variable inductor. The controlled DC power source includes a buck converter.

The variable inductor can include a core and a bias winding wound around the core, and the bias winding can be connected to the controlled DC power source to adjust the inductance of the variable inductor.

According to a preferred embodiment of the present invention, a method of controlling a converter; where the converter includes a high-voltage (HV) H-bridge including first and second HV legs, a low-voltage (LV) H-bridge including first and second LV legs, a transformer connecting the HV and the LV H-bridges, a variable inductor connected between the HV H-bridge and the transformer, and switches in the first and second HV legs and in the first and second LV legs; the method includes switching the switches using triple-phase-shift control and controlling an inductance of the variable inductor to control current in the switches in the second HV leg at turn off and at turn on.

In the method, the controlling of the inductance of the variable inductor can cause the switches in the second HV leg to be turned on with zero voltage switching or partial zero voltage switching and to be turned off with near zero current switching and can cause the switches in the first and the second LV leg to be turned off with reduced current switching or near zero current switching.

In the method, the converter can be operated in low, medium, and high power modes, and the controlling the inductance of the variable inductor can cause the converter to operate in the medium power mode near a boundary between the low and the medium power modes.

In the method, the HV bridge can connected to a HV voltage, the LV bridge is can be connected to a LV voltage, and the switching the switches using triple-phase-shift control can include:

- determining, using proportional-integral (PI) control, a parameter x based on comparison of a reference voltage and a measured voltage corresponding to either the HV voltage or the LV voltage;
- calculating a voltage ratio based on either:
  - a turns ratio of the transformer, the HV voltage, and the LV voltage; or
  - the turns ratio of the transformer, the reference voltage, and the measured voltage;
- calculating, based on the voltage ratio, a first boundary value corresponding to the boundary between the low and the medium power modes and a second boundary value corresponding to a boundary between the medium and high power modes; and
- calculating phase shift ratios used in the triple-phase-shift control based on the parameter x, the voltage ratio, the first boundary value, and the second boundary value.

In the method, the controlling the inductance of the variable inductor can use PI control to control the inductance of the variable inductor based on a comparison of the parameter x and the first boundary value.

The method can include pulse width modulating the switching of the switches in the HV and the LV H-bridges based on the phase shift ratios.

In the method, the controlling the inductance of the variable inductor can include using a controlled DC power source that provides a current to a bias winding of the variable inductor.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Figure 1:
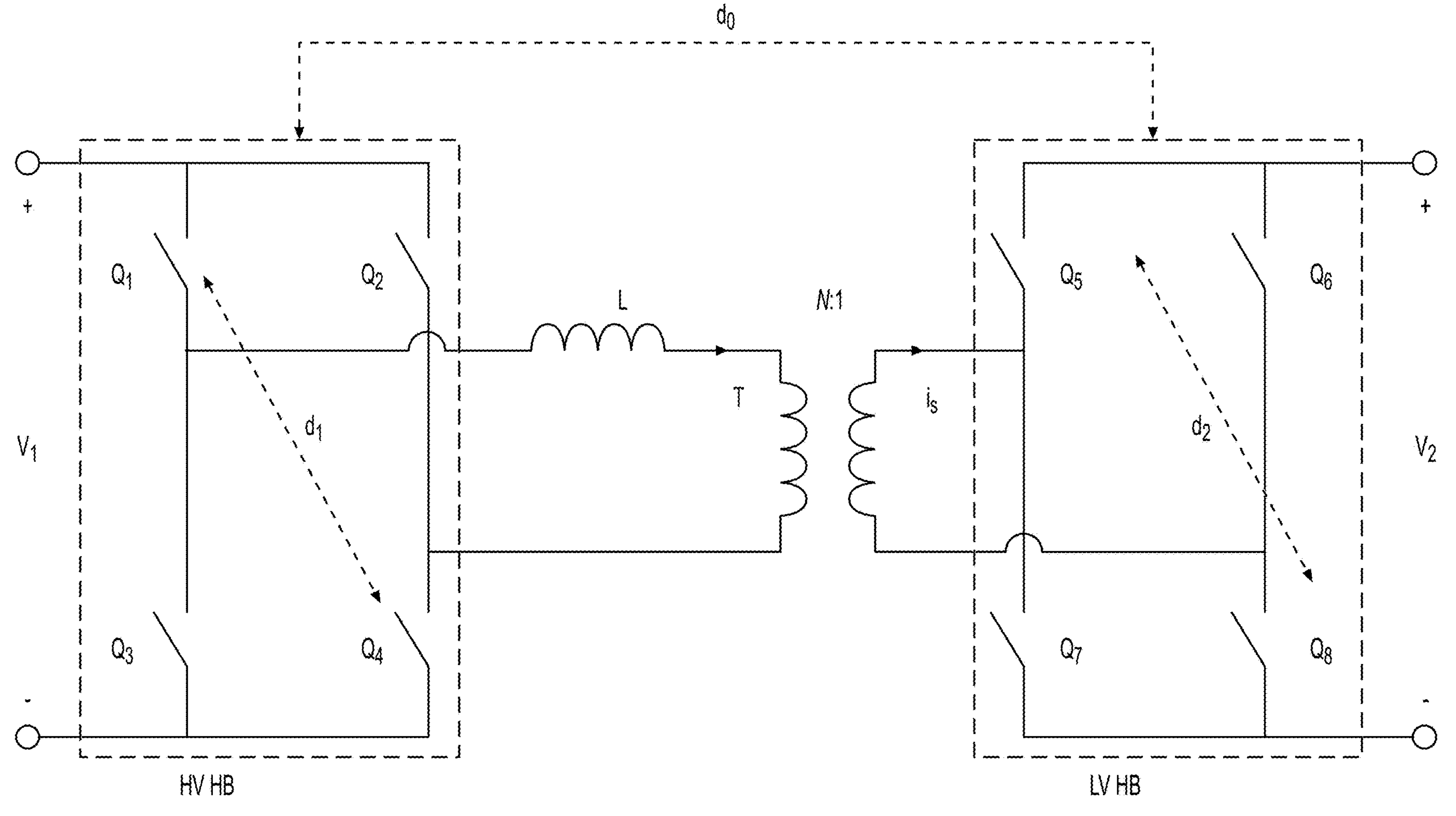
FIG. 1 is a schematic diagram of a dual active bridge converter circuit that can be used with known control methods and with control methods according to preferred embodiments of the present invention.

As shown in FIG. 1, a DC-DC converter with dual active bridge (DAB) topology can include a high-voltage (HV) H-bridge and a low-voltage (LV) H-bridge connected by a transformer T and can include an inductor L connected between the HV H-bridge and the transformer T. The side of the circuit with the HV H-bridge can be referred to as the HV side or the primary side, and the second of the circuit with the LV H-bridge can be referred to as the LV side or the secondary side. The HV H-bridge includes two legs on a HV side of the transformer T, and the LV H-bridge includes two legs on a LV side of the transformer T. FIG. 1 shows that switches $Q_1$ and $Q_3$ define a first HV leg and switches $Q_2$ and $Q_4$ define a second HV leg and that switches $Q_5$ and $Q_7$ define a first LV leg and switches $Q_6$ and $Q_8$ define a second LV leg. Controlling the switches $Q_1$-$Q_8$ in the converter determines the direction of power flow and the voltage gain. In each leg, only one of the two switches is on at a time, and the two switches in the leg can be complementarily controlled with a dead time, i.e., when the two switches in the leg are both turned off.

The transformer T has a turns ratio of N:1. In FIG. 1, the HV-side winding of the transformer T is connected to a first HV node between switches $Q_1$ and $Q_3$ and a second HV node between $Q_2$ and $Q_4$. An inductor L is connected between the first HV node and the HV-side winding. The LV-side winding is connected to a first LV node between $Q_5$ and $Q_7$ and a second LV node between $Q_6$ and $Q_8$.

The DAB topology provides bidirectional power flow, has a wide voltage conversion gain range, and can provide zero voltage switching (ZVS) capability with proper control under certain operating conditions. However, DAB converters are not particularly suited for high-current applications with a wide voltage range because, in such situations, DAB topology can suffer from large circulating, high peak, and subsequently large RMS current.

To mitigate these problems, a known triple phase shift (TPS) control can be used. TPS control uses three different phase shift ratios. In TPS control, three control parameters, phase shift ratios $d_0$, $d_1$, and $d_2$, are used, where do is the phase shift ratio (delay) between switches $Q_1$ to $Q_5$ (i.e., the external shift between HV H-bridge and LV H-bridge), $d_1$ is the phase shift ratio between switches $Q_1$ to $Q_4$ (i.e., the internal shift within the HV H-bridge), and $d_2$ is the phase shift ratio between switches $Q_5$ to $Q_8$ (i.e., the internal shift within the LV H-bridge). Each of the phase shift ratios $d_0$, $d_1$, and $d_2$ can be a number between zero and one, with zero being in phase and one being 180° out of phase. Thus, the phase shift ratios $d_0$, $d_1$, and $d_2$ satisfy $0 \leq d_0, d_1, d_2 \leq 1$.

TPS control can be operated in three power modes-low, medium, and high. Each power mode uses a set of control equations to minimize RMS current by optimizing the phase shift ratios in a certain power range. One example of such optimized control equations is discussed in Tong et al., "Modeling and Analysis of Dual-Active-Bridge Isolated Bidirectional DC/DC Converter to Minimize RMS Current with Whole Operating Range," IEEE Transactions on Power Electronics, vol. 33, no. 6 (2017), pp. 5302-5316, (hereinafter "Tong"), the entire contents of which are incorporated by reference. Due to a phase-shift configuration of the converter legs in each mode, the low power mode causes the transformer current to be discontinuous, i.e., when the current in the inductor L is zero. This discontinuous current can lead to a loss of ZVS in the second HV leg. Both the first and second LV legs can be operated with zero-current switching (ZCS) due to discontinuous transformer current. In the medium power mode, the second HV leg turns on with ZVS, but ZCS turn off is lost in both LV legs without using a variable inductor. An optimum operating point is at the boundary between the low and the medium power modes where the converter can provide the second HV leg with near ZCS turn off in addition to maintaining ZVS turn on and can provide the LV legs with near ZCS reduced current turn off, depending on, for example, the turns ratio of the transformer T, as explained below. To maintain the operating point close or near to the desired boundary between the low and medium power mode, the value of leakage inductance can be changed. To achieve the desired inductance range, variable control is applied to variable inductor Var L, and the inductance of the variable inductor Var L can be adjusted using a DC bias current Ibias, as discussed below with respect to FIG. 4.

ZVS, sometimes referred to as full ZVS, occurs when the voltage across a switching device is 0 V at the time that a gate voltage is applied. Partial ZVS occurs when the voltage across the switching device is not 0 V and is not at the maximum voltage at the time that the gate voltage is applied. Full ZCS occurs when the switching device is turned off with zero current. Near ZCS on the HV side occurs when the current at turn off is rather small, for example, greater than 0 but less than or equal to about 2 A. On the LV side, as the current depends on the turns ratio of the transformer T, near ZCS on the HV side might not result in near ZCS on the LV side where the LV side current is multiplied by a relatively large turns ratio. Thus, on the LV side, either near ZCS or reduced current turn off can be achieved.

Figure 2:
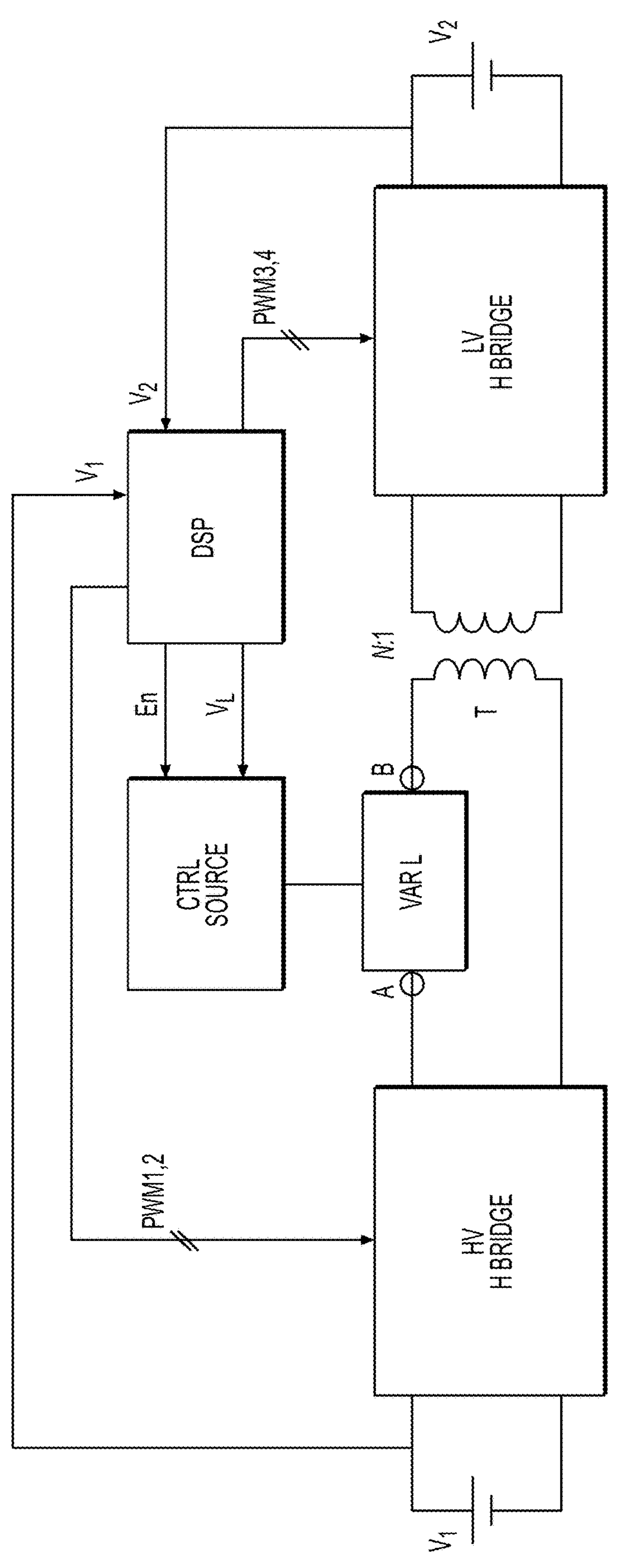
FIG. 2 is a block diagram of the dual active bridge converter circuit including active control.

FIG. 2 shows a block diagram of a DAB converter similar to the DAB converter shown in FIG. 1 but showing the control scheme for the DAB converter. The DAB converter in FIG. 2 shows the inductor as a variable inductor Var L. In FIG. 2, the DAB converter includes an HV H-bridge and a LV H-bridge connected by a transformer T, the variable inductor Var L connected between the HV H-bridge and the transformer T where nodes A and B represent connections of the variable inductor Var L similar to that shown in FIG. 4, a HV voltage $V_1$ connected to the HV H-bridge, a LV voltage $V_2$ connected to the LV H-Bridge, a digital signal processor DSP, and a controlled DC power source Ctrl Source. Both HV voltage $V_1$ and LV voltage $V_2$ are actively sensed and can be regulated in a closed loop by the digital signal processor DSP in both power flow directions. The digital signal processor DSP senses the HV voltage $V_1$ and LV voltage $V_2$ and provides pulse width modulation PWM control of the switches in the HV and LV H-bridges. Transformer T provides the required voltage scaling and isolation. The converter can be digitally controlled using the digital signal processor DSP. The digital signal processor DSP generates a reference signal $V_1$ that continuously adjusts the variable inductor Var L.

Figure 3:
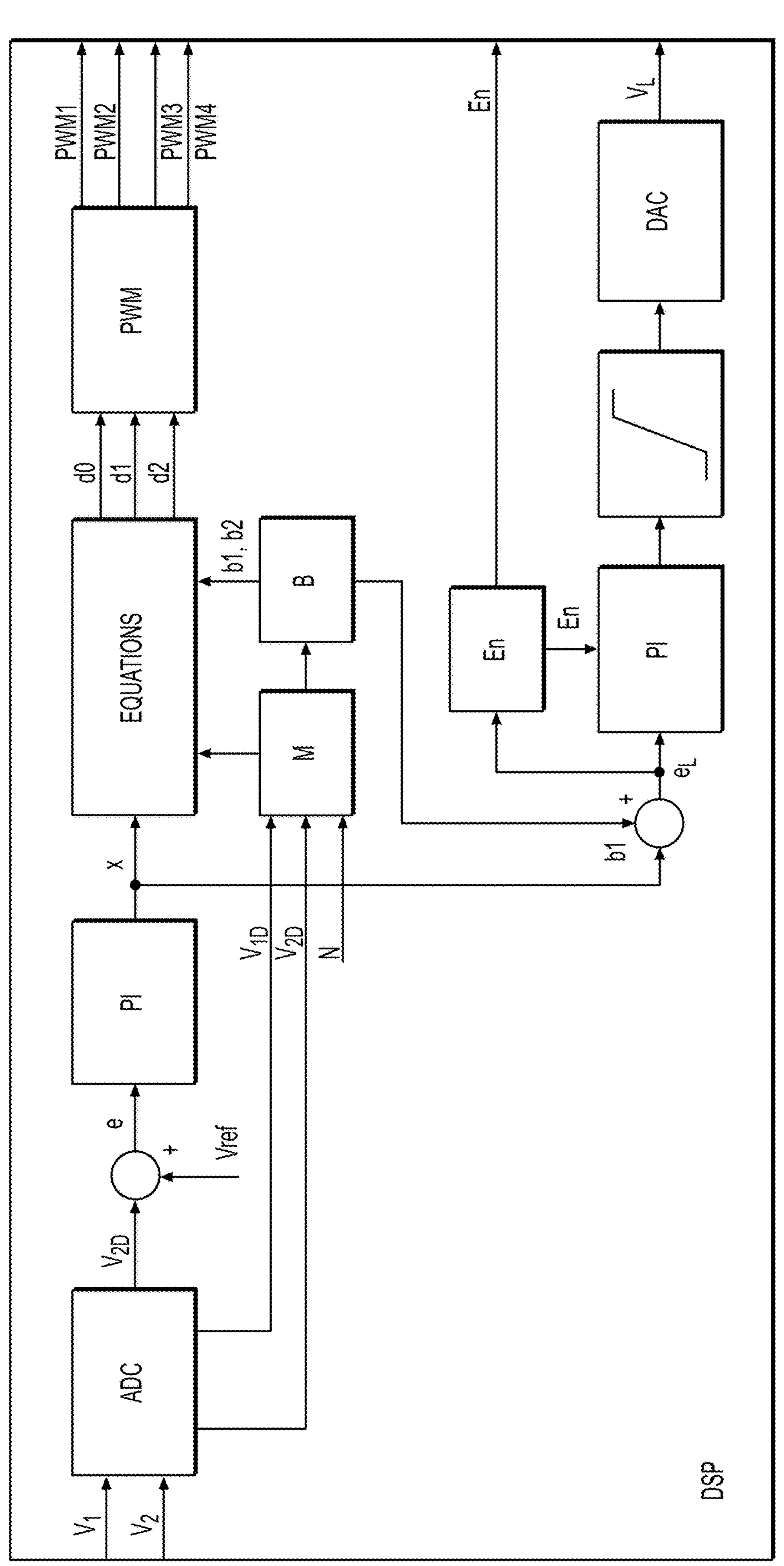
FIG. 3 is a block diagram of a digital control structure of the dual active bridge converter circuit.

FIG. 3 is a block diagram of a digital control structure implemented in the digital signal processor DSP. The digital signal processor can be configured and/or programmed to include the devices and/or to provide the functions shown in FIG. 3 and described herein. As described below, FIG. 3 shows the implemented digital control structure when power flows from the HV side to the LV side and with the LV voltage $V_2$ being controlled. If power flow is reversed, i.e., power flows from the LV side to the HV side, then a digital control structure can be implemented that is similar to the digital control structure discussed below but with the HV voltage $V_1$ being controlled instead of the LV voltage $V_2$. The modulation scheme shown in FIG. 3 uses closed-loop control with a first proportional integrated PI controller used in generating four PWM signals PWM1, PWM2, PWM3, and PWM4 for the switches in the HV and LV H-Bridges. The HV voltage $V_1$ and the LV voltage $V_2$ are both converted to digital values in an analog-to-digital converter ADC respectively as digital voltages $V_{1D}$ and $V_{2D}$. After conversion, a comparator compares the digital voltage $V_{2D}$ and a reference voltage Vref to provide an error signal e, and the voltage ratio calculator M uses the digital voltages $V_{1D}$ and $V_{2D}$ and the turns ratio N of transformer T to calculate input-to-output voltage ratio M ($M=N*V_{2D}/V_{1D}$). Values for the reference voltage Vref and the turns ratio N can be predetermined and can be preprogrammed in the digital signal processor DSP. FIG. 3 shows the voltage ratio calculator M receives the digital voltage $V_{2D}$ as measured. It is also possible to use the reference voltage Vref in the input-to-output voltage ratio M ($M=N*Vref/V_{1D}$), in which case the voltage ratio calculator M can receive the reference voltage Vref instead of the digital voltage $V_{2D}$. The reference voltage Vref can be equal to the digital voltage $V_{2D}$ if the LV voltage $V_2$ is well regulated. The boundary calculator B uses the voltage ratio M to calculate the boundary values b1 and b2, where boundary value b1 is between the low and medium power modes and boundary value b2 is between the medium and high power modes. The phase-shift-ratio calculator EQUATIONS uses the error signal, the voltage ratio M, and boundary values b1, b2 to calculate the phase shift ratios $d_0$, $d_1$, and $d_2$. The range for boundary values b1 and b2 is from 0 to 1, while b1 is always smaller than b2, i.e., $0<b1<b2\leq 1$.

Boundary calculator B can use any suitable method to determine the boundary values b1 and b2. For example, the boundary calculator B can use the methods discussed with respect to Tong's § IV(F) and FIG. 23. The boundary calculator B can, for example, determine that b1=M and that b2=1 as shown in Tong's FIG. 23 but other determinations are also possible.

The first PI controller outputs parameter x that has a range from 0 to 1.5 and that can be smaller, larger, or equal to the boundary values b1 and b2. The value of x is used in the phase-shift-ratio calculator EQUATIONS to generate the PWM signals and to regulate the LV voltage $V_2$ with respect to the reference voltage Vref. The first PI controller determines that value of x minimizes the error signal e at the input of the first PI controller. Boundary values b1 and b2 are fixed for fixed input and output conditions. If the output power of the converter is increased, then the value of parameter x will increase as well, and if the output power of the converter is decreased, then the value of parameter x will decrease as well. At some output power level, the value of the parameter x will be equal to the boundary value b1, and then as the output power level increases, the value of the parameter x increases towards the boundary value b2. If the output power level is increased even further, then the value of the parameter x will be equal to, and then increase above, the boundary value b2 until parameter x reaches its saturation value of 1.5. After reaching saturation, any further increase in the output power will force the control and output voltage out of regulation.

The phase-shift-ratio calculator EQUATIONS can use any suitable method to calculate the phase shift ratios $d_0$, $d_1$, and $d_2$, including, for example those discussed in Tong's §§ IV(A)-(E), including equations (20), (25), (28), (36).

The boundary value of interest is boundary value b1, between the low and medium power modes. By changing the inductance of the variable inductor Var L, the parameter x can be manipulated to a value slightly higher than boundary value b1. Depending on the operating conditions of the converter and when using Tong's methods, empirically it has been determined that the parameter x can be higher than the boundary value b1 by 0.01-0.1. In other words, by changing parameter x at the lowest end in medium power mode, the converter can achieve minimum continuous transformer current required for ZVS operation of the second leg on the HV side and still achieve reduced current turn off for the switches in the LV H-bridge. Theoretically, ZCS is lost but the current at turn off remains reasonably small. When the converter is operated in the medium power mode but not near or close to the boundary with the low power mode, a larger turnoff current is produced in the second HV leg and in both LV legs, as described below with respect to FIGS. 5-8.

To automatically adjust parameter x to be near or close to but slightly higher than boundary value b1, a second control loop is added and includes a second PI controller. The PI controller continuously calculates an error signal $e_L$, as the difference between boundary value b1 and the parameter x, and applies a correction based on proportional and integral terms. The PI controller attempts to reduce or minimize the error over time by adjusting the control variable that is input into the limiter, which results in the analog reference voltage $V_L$ being adjusted. The output of the second PI controller is then limited by the limiter and then input to a digital-to-analog converter DAC where the limited output is converted into an analog reference voltage $V_L$. The enabler EN in FIG. 3 provides decoupling of the second control loop when an inductance correction is not required or when the desired inductance value is achieved. The enable signal En is input into the controlled DC power source Controlled Source to enable or disable the controlled DC power source Controlled Source.

The terms "partial ZVS," "near ZCS," and "reduced current turn off" depend on the application, the types of devices used, how the DAB converter is designed, the dead time of the switches, the transformer turns ratio, etc. For example, it is possible to maintain ZVS when switch current is −0.2 A, but partial ZVS can be achieved with even smaller switch current but higher than 0 A. The closer the second HV leg switches $Q_2$ and $Q_4$ are to achieving zero amp turn on, the closer the switches $Q_2$ and $Q_4$ are to achieving ZCS turn off, and the closer the LV side switches $Q_5$-$Q_8$ are to achieving ZCS turn off. Theoretically, when the parameter x is equal to B1, ZVS is lost and ZCS can be achieved. In practice, a partial ZVS is still possible. If the parameter x is lower than boundary value b1, ZVS operation of the second HV leg will disappear, but deep ZCS (or very nearly ZCS) can be achieved on that second HV leg and for the LV side switches $Q_5$-$Q_8$ due to discontinuous current. Near ZCS turn off of the HV side current can be considered to be up to about 5% of the peak primary current, within measurement tolerances. "Reduced current turn off" of the LV side can be considered to be about equal to the current of the near ZCS turn off of the HV side multiplied by the turns ratio of the transformer, i.e., N*0.05*peak primary current, where N is the turns ratio of the transformer. An example of "reduced current turn off" is described below with respect to FIGS. 5 and 6.

It has been observed that in practical application that it is best to maintain a small negative current during turn on for the switches $Q_2$, $Q_4$ in the second HV leg to maintain ZVS, which almost achieves ZCS and greatly reduces turn off losses. This is a result of operating the converter near but above the boundary between the low and medium power modes. In the low power mode, the current during turn on/turn off for the second HV leg is 0 A because the transformer current is discontinuous. As soon as the converter is operated in the medium power mode (i.e., above boundary value b1), switches $Q_2$ and $Q_4$ in the second HV leg are operated in the $3^{rd}$ quadrant and are turned on with small negative current, which allows ZVS turn on of switches $Q_2$ and $Q_4$. Operation of the converter near but above the boundary between the low and medium power modes is also where ZCS turn off is lost but the turn off current is still small, thus at near ZCS turn off. The corresponding turn off loss is still small, but there is no turn on loss due to ZVS turn on operation. This also largely reduces the current at turn off on the LV side and associated turn off losses. However, the current at turn off of the switches $Q_5$-$Q_8$ on the LV side, while reduced, might be about 30 A-50 A, for example, if the HV side current is 1 A-2 A at turn off, because the LV side current is multiplied by the transformer turns ratio. But, if the transformer was not used or if the turns ratio is smaller, then LV side current could be equal to the HV side current or at least much closer to it, in which case ZCS can be achieved on both LV and HV sides as the HV and LV currents would be the same or similar.

Figure 4:
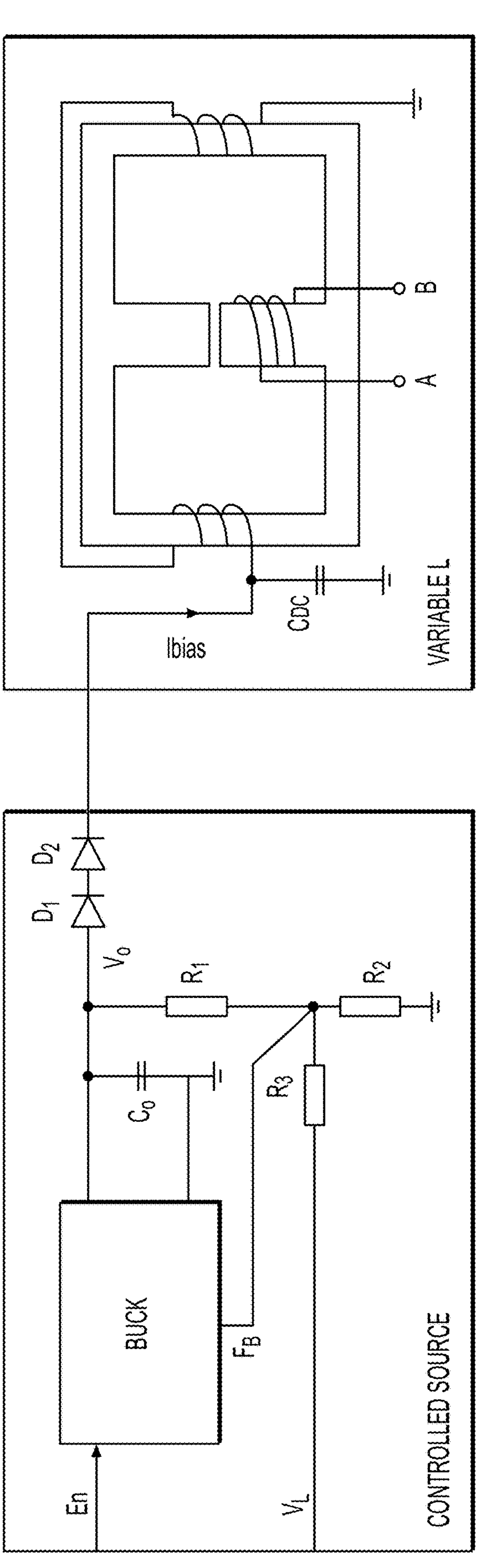
FIG. 4 is a schematic diagram of a variable inductor and a power source of the dual active bridge converter circuit.

As shown in FIG. 4, the controlled DC power source includes, for example, a buck converter Buck that is used to provide adjustable voltage regulation to drive the DC bias current Ibias in the DC bias winding of the variable inductor Var L. The voltage $V_1$ generated in the digital signal processor DSP influences the feedback voltage FB at the node FB of the buck converter Buck. The voltage $V_1$ is able to increase or decrease the node FB voltage to tune an output voltage $V_o$ of the buck converter Buck. Due to the inability of the buck converter Buck, as commercially available in integrated buck controller integrated circuits (ICs), being able to operate below its internal reference and to improve overall controllability of output voltage $V_o$, two diodes $D_1$ and $D_2$ are connected in series with the output voltage $V_o$ to offset the voltage. As shown, the buck converter Buck cannot provide zero volts, and any small voltage would cause current to flow in the DC bias winding of the variable inductor Var L because the resistance in the circuit comes only from the wiring and is relatively low. The diodes $D_1$ and $D_2$ offset the output voltage $V_o$ by around (0.7 V*2) to provide a smooth transition to minimum current at all times. The DC bias current Ibias of the variable inductor Var L is limited by the maximum allowed range of the voltage $V_L$. The bias current Ibias can be calculated knowing the DC resistance of the wiring in the circuit and the required adjustment of inductance value. However, the calculation methodology is dependent on the geometry of the core in the variable inductor Var L. The maximum current and the inductance range required for the maximum change in inductance can be experimentally obtained for a known variable inductor Var L.

FIG. 4 shows one arrangement of the controlled DC power source but other controlled DC power sources can also be used.

FIG. 4 shows one arrangement of a variable inductor, but other variable inductors can also be used. An inductor can be variable with the addition of a bias winding with a suitable core geometry that permits changing the inductance using the additional magnetic field generated by the bias winding.

In operation, the converter starts with a bias current Ibias of zero at the variable inductor Var L. While the parameter x is below boundary b1, the enable EN circuitry is off, and the inductor bias current Ibias remains zero. As parameter x increases with rising power levels, the parameter increases above boundary value b1 and would increase toward b2. When parameter x increases above boundary value b1, the enable EN circuitry turns on the buck converter Buck and the second PI controller. The limited output of the second PI controller is input into the digital-to-analog converter DAC, which causes the buck converter Buck to increase the output voltage $V_o$. The output voltage $V_o$ slowly increases above a forward conduction voltage of the series connected diodes $D_1$ and $D_2$, causing the DC bias current Ibias to flow through the bias winding of the variable inductor Var L. The DC bias current Ibias in the bias winding modulates a permeability change in the core of the variable inductor Var L, causing the inductance of the variable inductor Var L to change. Due to the opposite polarity of the serially connected bias windings on the side arms of the core, the mutual coupling between the main AC winding in the middle leg and the bias winding is zero. A cumulative effect of applied DC bias is similar to adding a variable gap in the side legs of the core, resulting in a decreased inductance value. As shown in FIG. 4, the bias winding is in parallel with a capacitor $C_{DC}$ used to cancel any AC voltage induced in the DC bias winding. This helps simplify the driving circuit. That is, in a circuit without a capacitor in parallel with the bias winding, some AC voltage is induced in the bias winding which makes the construction of the controlled DC power source more complicated due to the presence of the AC voltage. Including the capacitor $C_{DC}$, as shown in FIG. 4, provides a low impedance configuration by removing induced AC voltage in the bias winding. Therefore, the controlled DC power source circuitry can be simplified.

FIG. 5-8 show waveforms of an exemplary DAB converter circuitry previously described. The DAB converter circuitry uses the following parameters: high voltage HV=336 V, low voltage VL=12 V, and power=3 KW. The inductance of the variable inductor Var L is controlled from an initial value of 27 μH down to a minimum value of 17.5 μH using a controlled DC power source. The waveforms shown in FIGS. 5-8 are relative currents and gate voltages over time with peak current values indicated for switches $Q_1$, $Q_4$, $Q_5$, $Q_8$, HV side Ip, and LV side Is. The waveform $I_Q$ is the current through the particular switch, and the waveform VG is the gate voltage of that particular switch.

Figure 5:
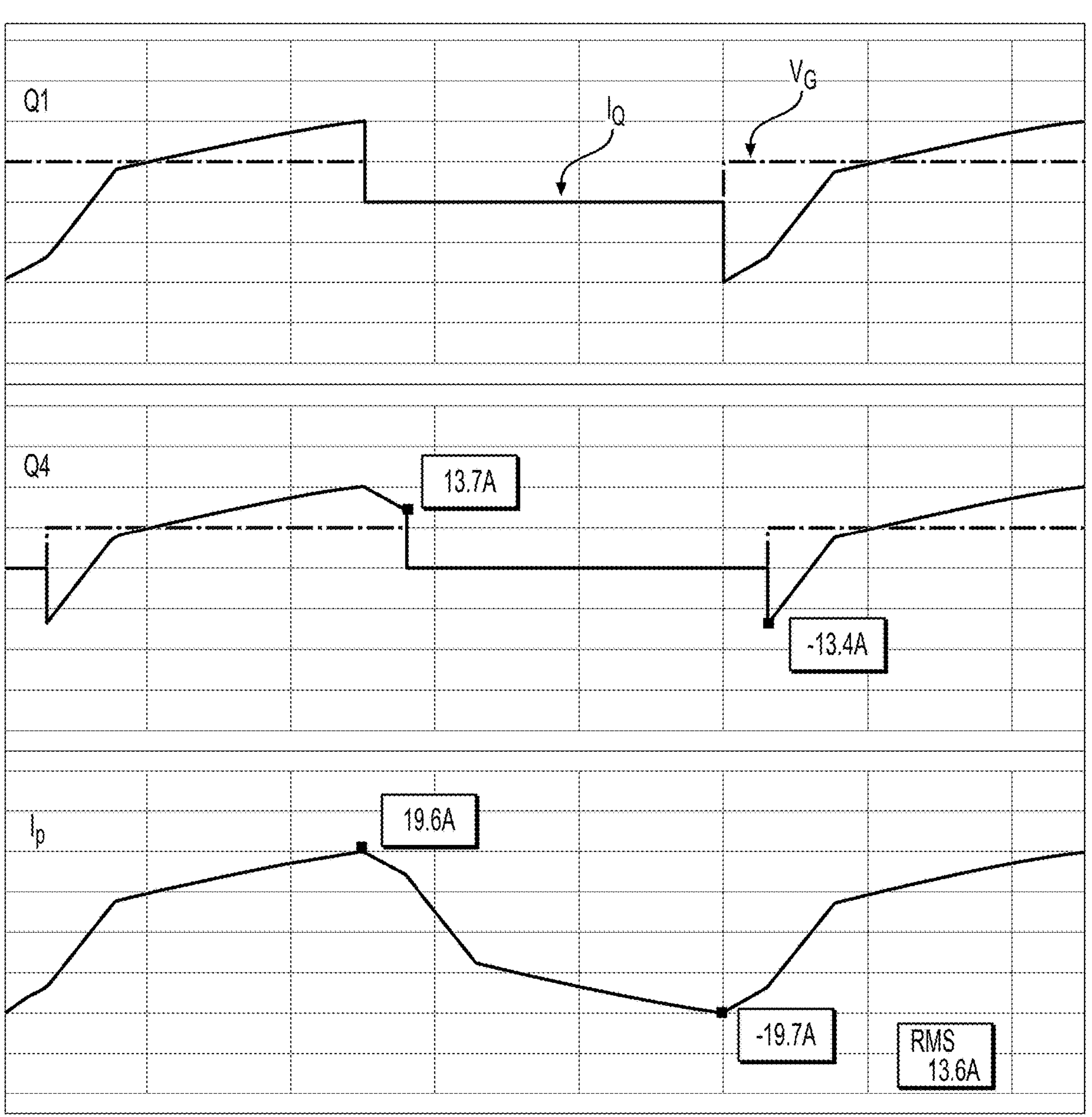
FIGS. 5-8 are waveform diagrams of examples of the DAB converter circuit.
Figure 6:
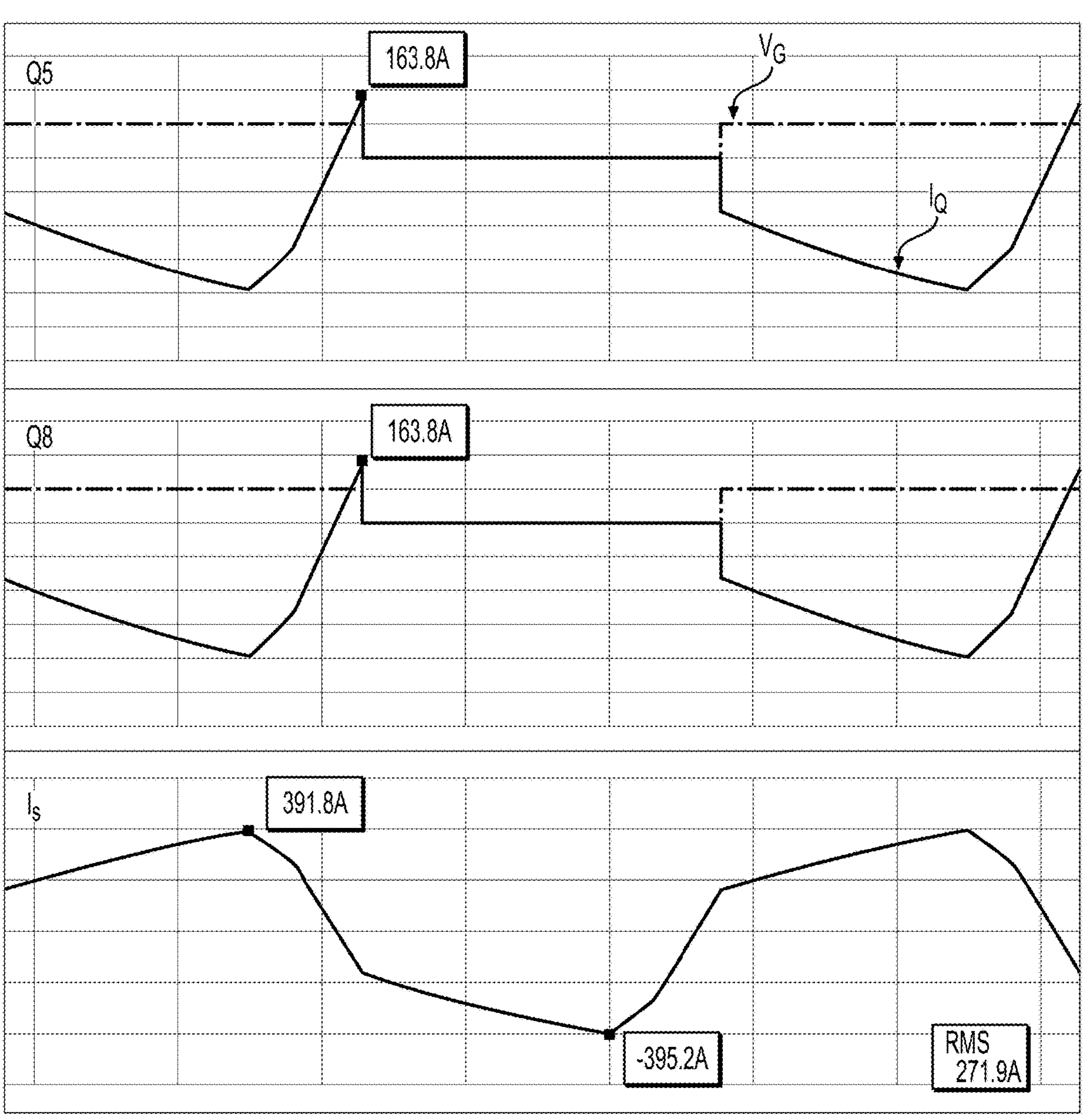
Figure 7:
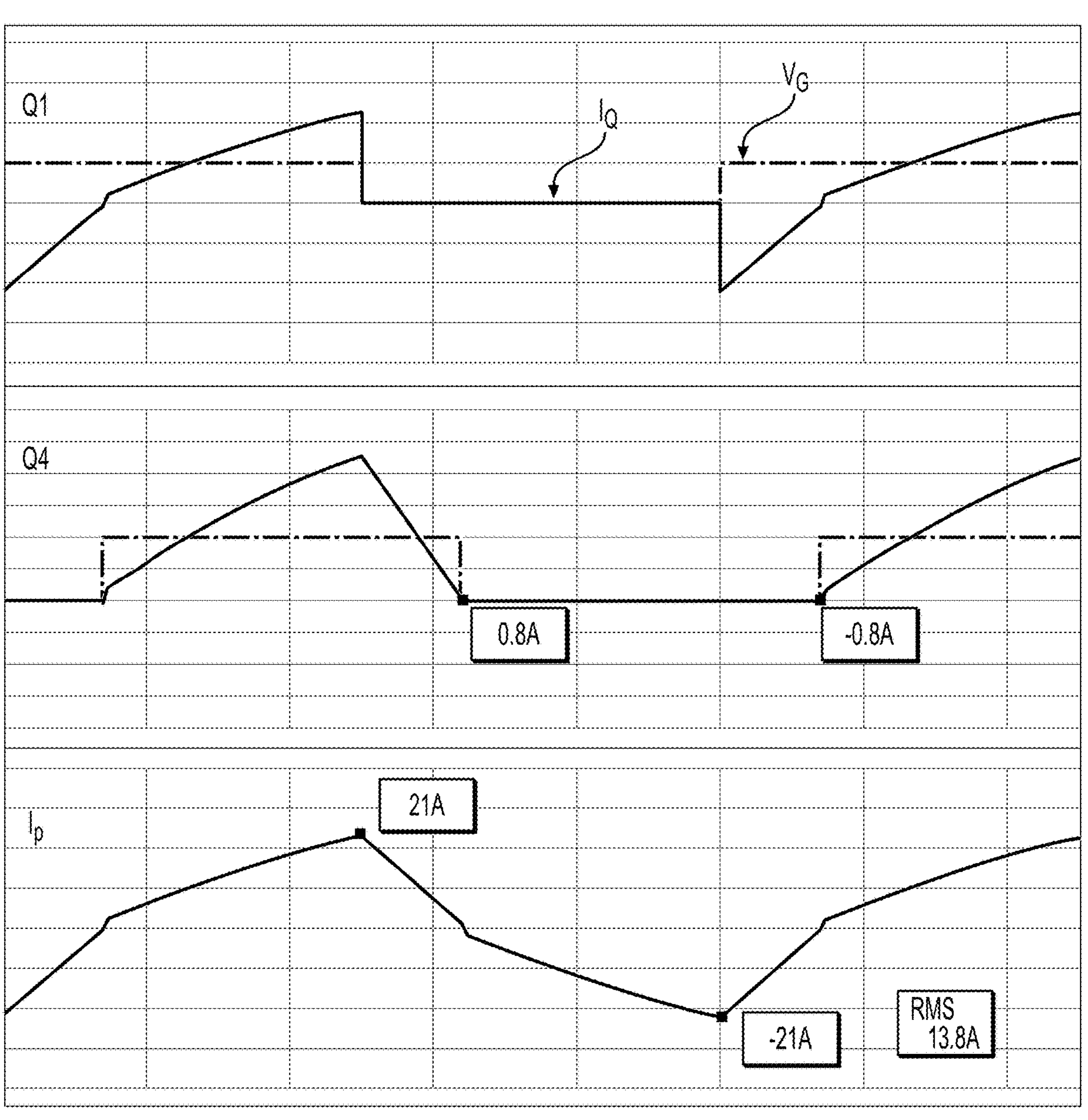
Figure 8:
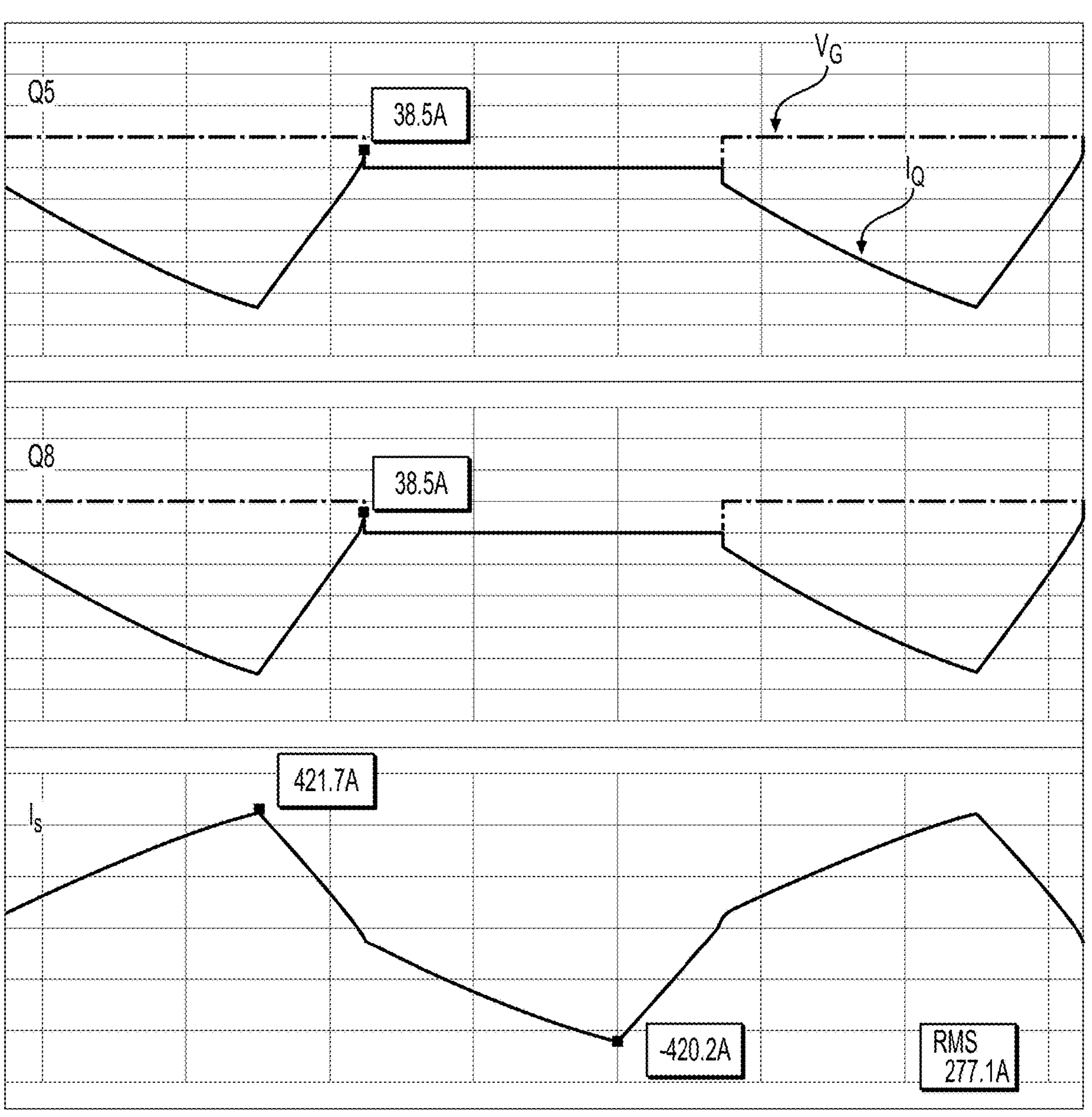

As shown in FIGS. 5 and 6, the initial case, without inductance control and with the value of the variable inductor Var L set at 27 μH, shows slightly lower (less than 10%) RMS and peak currents of the HV current Ip and switch current $I_Q$, than when inductance is controlled, as shown in FIGS. 7 and 8. When the inductance of variable inductor Var L is controlled, the current at turn off on the LV side switches $Q_5$, $Q_8$ is greatly reduced from 163.8 A to 38.5 A for both LV legs. On the HV side, current at turn off of the second leg (switches $Q_2$ and $Q_4$) is also reduced from 13.7 A to 0.8 A, almost to the ZCS level, i.e., near ZCS level. Also, during turn on, the current through the switch $Q_4$ is still negative −0.8 A, providing ZVS turn-on (the switch $Q_4$ will turn on with ZVS if the current is negative through the switch $Q_4$ when the gate signal goes high).

In this case, the DAB converter circuitry can provide the second HV leg with near ZCS turn off, while maintaining ZVS turn on. Since ZVS turn on existed prior to lowering the inductance in the initial case with a variable inductance value of 27 μH, as can be seen from the negative current −13.4 A, it is desirable to maintain this condition while driving the current of $Q_4$ closer to zero, while keeping this current value a small negative number to maintain ZVS operation. At the same time, a reduction in current at turn off for switches $Q_2$ and $Q_4$ greatly reduces turn off losses. A reduction in turn off current for all LV side switches $Q_5$-$Q_8$ substantially reduces turn off loss as well.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A dual active bridge (DAB) converter connected between a HV voltage and a LV voltage, the DAB converter comprising:

a variable inductor; and a controller configured or programmed to:

operate in first and second power modes;

control the DAB converter using triple-phase-shift control; and control the variable inductor such that the DAB converter is operated in the second power mode near a boundary between the first and the second power modes using a first proportional-integral (PI) controller based on a comparison of:

a parameter x based on a comparison of a reference voltage and a measured voltage corresponding to either the HV voltage or the LV voltage; and a first boundary value corresponding to the boundary between the first and the second power modes.

2. The DAB converter of claim 1, wherein an inductance of the variable inductor is controlled by the controller such that switches in a leg of a high-voltage (HV) H-bridge of the DAB converter are turned on with zero voltage switching or partial zero voltage switching and turned off with near zero current switching and such that switches in both legs of a low-voltage (LV) H-bridge of the DAB converter turn off with reduced current switching or near zero current switching.

3. The DAB converter of claim 2, wherein the HV H-bridge is connected to the HV voltage; the LV H-bridge is connected to the LV voltage; and the controller is configured or programmed to include: a second PI controller to determine the parameter x; a voltage ratio calculator to determine a voltage ratio based on either: a turns ratio of a transformer, the HV voltage, and the LV voltage; or the turns ratio of the transformer, the reference voltage, and the measured voltage; a boundary calculator to calculate, based on the voltage ratio, the first boundary value and a second boundary value corresponding to a boundary between the second power and a third power modes; and a phase-shift-ratio calculator to determine phase shift ratios used in the triple-phase-shift control based on the parameter x, the voltage ratio, the first boundary value, and the second boundary value.

4. A converter comprising:
- a high-voltage (HV) H-bridge connected to a HV voltage and including first and second HV legs;
- a low-voltage (LV) H-bridge connected to a LV voltage and including first and second LV legs;
- a transformer connecting the HV and the LV H-bridges; and
- a variable inductor connected between the HV H-bridge and the transformer; and
- a controller configured or programmed to:
  - operate in low, medium, and high power modes;
  - control switching of switches in the HV and the LV H-bridges using triple-phase-shift control;
  - control an inductance of the variable inductor such that the converter is operated in the medium power mode near a boundary between the low and the medium power modes using a first proportional-integral (PI) controller based on a comparison of:
    - a parameter x based on a comparison of a reference voltage and a measured voltage corresponding to either the HV voltage or the LV voltage; and
    - a first boundary value corresponding to the boundary between the low and the medium power modes.

5. The converter of claim 4, wherein the controller is configured or programmed to control the inductance of the variable inductor to control current in switches in the second HV leg at turn on and at turn off.

6. The converter of claim 4, wherein the controller is configured or programmed to control the inductance of the variable inductor such that switches in the second HV leg are turned on with zero voltage switching or partial zero voltage switching and are turned off with near zero current switching and such that switches in the first and the second LV legs are turned off with reduced current switching or near zero current switching.

7. The converter of claim 4, wherein the controller is configured or programmed to include:
- a second proportional-integral (PI) controller to determine the parameter x;
- a voltage ratio calculator to determine a voltage ratio based on either:
  - a turns ratio of the transformer, the HV voltage, and the LV voltage; or
  - the turns ratio of the transformer, the reference voltage, and the measured voltage;
- a boundary calculator to calculate, based on the voltage ratio, the first boundary value and a second boundary value corresponding to a boundary between the medium and high power modes; and
- a phase-shift-ratio calculator to determine phase shift ratios used in the triple-phase-shift control based on the parameter x, the voltage ratio, the first boundary value, and the second boundary value.

8. The converter of claim 7, wherein the controller is configured or programmed to include a pulse width modulator to control the switching of the switches in the HV and the LV H-bridges using pulse width modulated signals based on the phase shift ratios.

9. The converter of claim 4, further comprising a controlled DC power source connected to the variable inductor.

10. The converter of claim 9, wherein the controlled DC power source includes a buck converter.

11. The converter of claim 9, wherein
- the variable inductor includes a core and a bias winding wound around the core; and
- the bias winding is connected to the controlled DC power source to adjust the inductance of the variable inductor.

12. A method of controlling a converter, the converter including:
- a high-voltage (HV) H-bridge connected to a HV voltage and including first and second HV legs;
- a low-voltage (LV) H-bridge connected to a LV voltage and including first and second LV legs;
- a transformer connecting the HV and the LV H-bridges;
- a variable inductor connected between the HV H-bridge and the transformer; and
- switches in the first and second HV legs and in the first and second LV legs, the method comprising:
- operating the converter in low, medium, and high power modes;
- switching the switches using triple-phase-shift control; and
  - controlling an inductance of the variable inductor to control current in the switches in the second HV leg at turn off and at turn on such that the converter is operated in the medium power mode near a boundary between the low and the medium power modes using a proportional-integral (PI) control based on comparing:
    - a parameter x based on comparing a reference voltage and a measured voltage corresponding to either the HV voltage or the LV voltage; and
    - a first boundary value corresponding to the boundary between the low and the medium power modes.

13. The method of claim 12, wherein the controlling the inductance of the variable inductor causes the switches in the second HV leg to be turned on with zero voltage switching or partial zero voltage switching and to be turned off with near zero current switching and causes the switches in the first and the second LV leg to be turned off with reduced current switching or near zero current switching.

14. The method of claim 12, wherein the switching the switches using triple-phase-shift control includes:
- determining, using PI control, the parameter x;
- calculating a voltage ratio based on either:
  - a turns ratio of the transformer, the HV voltage, and the LV voltage; or
  - the turns ratio of the transformer, the reference voltage, and the measured voltage;
- calculating, based on the voltage ratio, the first boundary value and a second boundary value corresponding to a boundary between the medium and high power modes; and
- calculating phase shift ratios used in the triple-phase-shift control based on the parameter x, the voltage ratio, the first boundary value, and the second boundary value.

15. The method of claim 14, further comprising pulse width modulating the switching of the switches in the HV and the LV H-bridges based on the phase shift ratios.

16. The method of claim 12, wherein the controlling the inductance of the variable inductor includes using a controlled DC power source that provides a current to a bias winding of the variable inductor.

* * * * *